(12) United States Patent
Kim

(10) Patent No.: US 7,180,552 B2
(45) Date of Patent: Feb. 20, 2007

(54) CHANNEL EQUALIZER IN DIGITAL TV RECEIVER

(75) Inventor: Woo Chan Kim, Gyeonggi-do (KR)

(73) Assignee: LG Electronics, Inc., Seoul (KR)

(*) Notice: Subject to any disclaimer, the term of this patent is extended or adjusted under 35 U.S.C. 154(b) by 522 days.

(21) Appl. No.: 10/697,884

(22) Filed: Oct. 31, 2003

(65) Prior Publication Data

US 2004/0100587 A1 May 27, 2004

(30) Foreign Application Priority Data

Oct. 31, 2002 (KR) .................. 10-2002-0067136

(51) Int. Cl.
*H04N 5/44* (2006.01)
*H04L 25/08* (2006.01)
*H04B 1/10* (2006.01)

(52) U.S. Cl. ............... 348/725; 348/607; 348/614; 348/726; 375/229; 375/233; 375/346

(58) Field of Classification Search ............. 348/607, 348/725–727, 614, 720; 375/229, 232–234, 375/346, 348–350

See application file for complete search history.

(56) References Cited

U.S. PATENT DOCUMENTS

| | | | |
|---|---|---|---|
| 5,513,215 A * | 4/1996 | Marchetto et al. ......... 375/233 |
| 6,234,414 B1 * | 5/2001 | DeVitis et al. ............. 241/30 |
| 6,490,007 B1 * | 12/2002 | Bouillet et al. ............ 348/614 |
| 6,559,894 B2 * | 5/2003 | Omura et al. ............. 348/614 |
| 6,600,778 B1 * | 7/2003 | Nam ......................... 375/232 |
| 6,734,920 B2 * | 5/2004 | Ghosh et al. .............. 348/614 |
| 6,816,548 B1 * | 11/2004 | Shiue et al. ............... 375/233 |
| 6,829,298 B1 * | 12/2004 | Abe et al. ................. 375/233 |
| 6,834,109 B1 * | 12/2004 | Pare et al. ................. 379/416 |
| 6,894,728 B2 * | 5/2005 | DSouza ..................... 348/614 |
| 6,912,258 B2 * | 6/2005 | Birru ........................ 375/340 |
| 7,006,566 B2 * | 2/2006 | Birru ........................ 375/233 |
| 7,042,937 B2 * | 5/2006 | Birru ........................ 375/233 |
| 2002/0037058 A1 * | 3/2002 | Birru ........................ 375/340 |
| 2002/0154689 A1 * | 10/2002 | Storm et al. .............. 375/232 |
| 2003/0227967 A1 * | 12/2003 | Wang et al. ............... 375/229 |
| 2004/0042545 A1 * | 3/2004 | Han et al. ................. 375/232 |
| 2004/0156460 A1 * | 8/2004 | Kim et al. ................. 375/350 |

* cited by examiner

*Primary Examiner*—Brian P. Yenke
(74) *Attorney, Agent, or Firm*—McKenna, Long & Aldridge

(57) ABSTRACT

Channel equalizer of VSB modulation system in a digital TV receiver, including a frequency domain equalizer for equalizing a received signal to remove a distorted component from the received signal, a noise removing part for removing noise from the equalized signal, a time domain equalizer for equalizing a signal from the frequency domain equalizer or the noise removing part to remove a distorted component from the signal, and an error providing part for estimating an error required for renewal of a coefficient at the time domain equalizer by using a signal from the time domain equalizer or the noise removing part, and feeding the error back to the time domain equalizer.

16 Claims, 3 Drawing Sheets

CHANNEL EQUALIZER IN DIGITAL TV RECEIVER

This application claims the benefit of the Korean Application No. P2002-67136 filed on Oct. 31, 2002, which is hereby incorporated by reference.

BACKGROUND OF THE INVENTION

1. Field of the Invention

The present invention relates to a channel equalizer in a digital TV receiver of a VSB (Vestigial Side Band) modulation system.

2. Description of the Related Art

In most of current digital transmission systems, and an ATSC (Advanced Television Systems Committee) 8VSB transmission system suggested as a digital TV (DTV) transmission system for the USA, when a broadcasting signal is transmitted on a channel through air or a line, the digital TV receiver receives the broadcasting signal together with signals reflected at different reflectors. Since the reflected components distort an original signal, it is impossible to obtain the original signal only from the received signal. The components that distort the original signal are ghost, or fading, or the like.

The signal distorted thus causes a bit detection error at the digital TV receiver, such that restoration of a whole picture is impossible, or a totally different picture is displayed.

In order to overcome this, the digital TV receiver is provided with the equalizer to compensate for the component (i.e., the ghost, or the fading) that distorts the transmitted signal between a transmitter terminal and a receiver terminal.

In the equalizers, there are time-domain equalizer, and frequency-domain equalizers, all of which serve for removing the component that distorts the original signal.

The frequency-domain equalizer estimates an impulse response of a channel from a time domain signal, and converts the channel impulse response into a frequency domain signal. Then, the frequency-domain equalizer controls parameters of the frequency-domain equalizer so that the frequency domain signal distorted on the channel becomes an ideal frequency domain signal, for correcting the distortion. That is, after a received time domain signal is converted into a frequency domain signal, the frequency domain equalizer compensate for the faded components. Then, the compensated frequency domain signal is converted into a time domain signal, again.

In this instance, when a signal having a fading passes through the frequency-domain equalizer, though the fading is compensated, an amplification of a noise is taken place.

FIG. 1 illustrates a block diagram of a channel equalizer in a related art digital TV receiver with a frequency-domain equalizer and a noise removing part, wherein a demodulating part 101 tunes to a desired channel from RF (Radio Frequency) signals received through an antenna, converts a RF signal on the tuned channel into an IF (Intermediate Frequency) signal, demodulates the IF signal in reverse of a VSB modulating system, and provides to the frequency-domain equalizing part 102. Then, the frequency domain equalizing part 102 estimates the impulse response of the channel from the time domain signal received thus, converts the channel impulse response estimated thus into a frequency domain signal, and compensates for fading components thereof by controlling parameters, and provides to a noise removing part 103. The noise removing part 103 removes noise amplified at the time of equalizing from an output of the frequency domain equalizer 102.

The frequency-domain equalizer 102 requires a signal the same with a field sync as shown in FIG. 2 for estimating the channel impulse response.

FIG. 2 illustrates a data frame architecture at a digital TV receiver of a VSB system, wherein one frame has two fields, and one field has 313 data segments. One data segment has 832 symbols. In the data segment, first four symbols are segments synchronizing part, and in the field, a first data segment is a field synchronizing part.

That is, in the VSB data frame structure in FIG. 2, a field synchronizing signal appears at every 24.2 ms. Therefore, the parameter renewal at the frequency-domain equalizer is made at every 24.2 ms.

Accordingly, in a channel environment in which the fading is faster than 24.2 ms, the frequency-domain equalizer in FIG. 1 can not compensate for the fading, properly. That is, since there are many cases the fading is faster than 24.2 ms in an actual environment, the equalizer in FIG. 1 can not provide a proper performance.

SUMMARY OF THE INVENTION

Accordingly, the present invention is directed to a channel equalizer in a digital TV receiver that substantially obviates one or more of the problems due to limitations and disadvantages of the related art.

An object of the present invention is to provide a channel equalizer in a digital TV receiver, which can compensate for a fast fading (or ghost).

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

The channel equalizer in a digital TV receiver of the present invention for achieving the foregoing object is characterized in that a good performance can be provided not only on a static channel, but also on a dynamic channel by combining a frequency domain equalizer with a time domain equalizer which makes coefficient renewal faster than the frequency domain equalizer.

To achieve these objects and other advantages and in accordance with the purpose of the present invention, as embodied and broadly described herein, the channel equalizer in a digital TV receiver includes a frequency domain equalizer for equalizing a received signal to remove a distorted component from the received signal, a noise removing part for removing noise from the equalized signal, a time domain equalizer for equalizing a signal from the frequency domain equalizer or the noise removing part to remove a distorted component from the signal, and an error providing part for estimating an error required for renewal of a coefficient at the time domain equalizer by using a signal from the time domain equalizer or the noise removing part, and feeding the error back to the time domain equalizer.

The frequency domain equalizer carries out the steps of converting a received time domain signal into a frequency domain signal, equalizing the frequency domain signal, and converting the equalized frequency domain signal into a time domain signal.

The noise removing part is connected to one of output terminals of the frequency domain equalizer, and the time domain equalizer.

The time domain equalizer makes coefficient renewal by using one of signals from the frequency domain equalizer and the noise removing part and an error fed back from the error providing part, to compensate the signal for a signal distortion caused by fast fading.

The time domain equalizer makes coefficient renewal faster than a field synchronization period.

The time domain equalizer is of an LMS (Least Mean Square), a RLS (Recursive Least Square), or a ZF (Zero Forcing) type.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
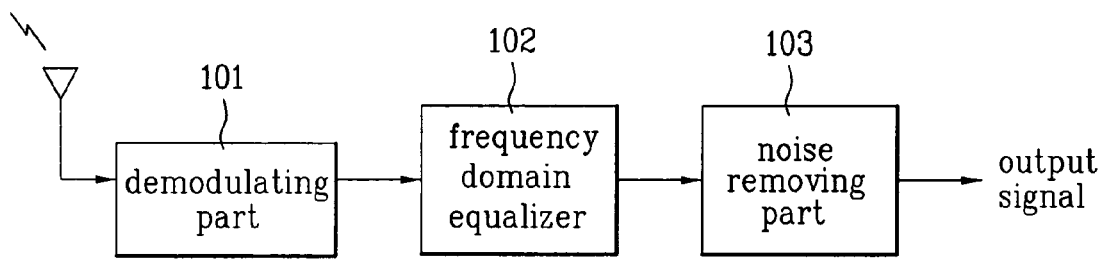
FIG. 1 illustrates a block diagram of a channel equalizer in a related art digital TV receiver.
Figure 2:
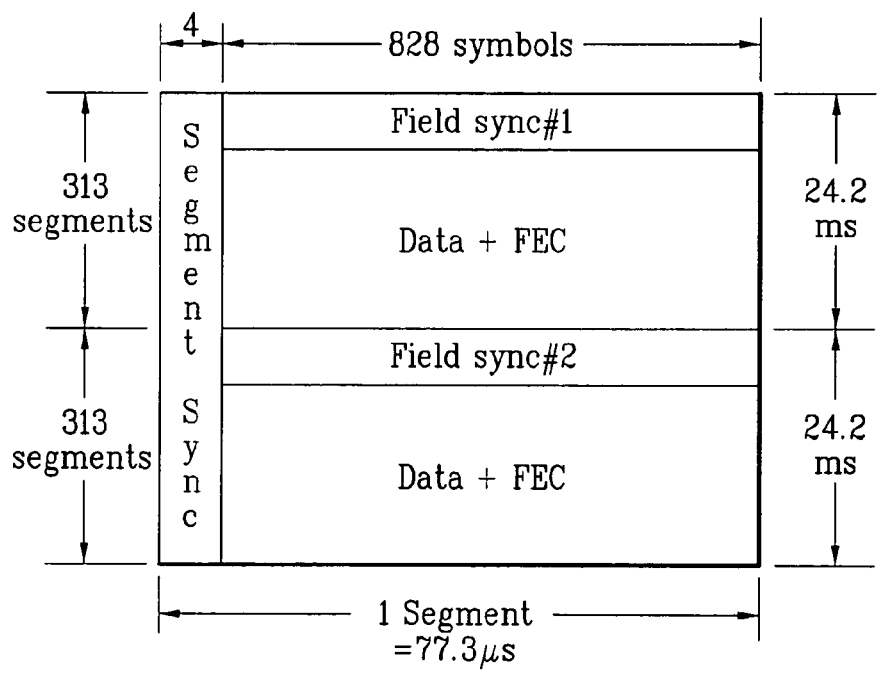
FIG. 2 illustrates a data frame architecture at a related art digital TV receiver.
Figure 3:
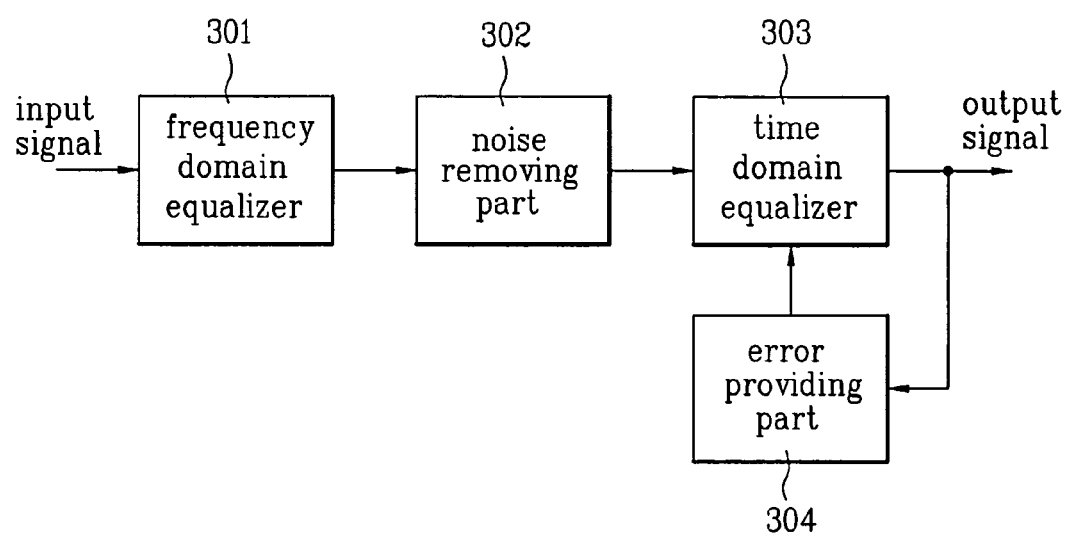
FIG. 3 illustrates a block diagram of a channel equalizer in a digital TV receiver in accordance with a first preferred embodiment of the present invention.

FIG. 3 illustrates a block diagram of a channel equalizer in a digital TV receiver in accordance with a first preferred embodiment of the present invention.

Referring to FIG. 3, there is a frequency-domain equalizer 301 with an output terminal connected to a noise removing part 302, to an output terminal of which a time-domain equalizer 303 is connected, and to an output terminal of which an error providing part 304. The time-domain equalizer 303 renews parameters by using the output from the noise removing part 302 and an error from the error providing part 304, to compensate for a distortion of a signal from the noise removing part 302 in a time domain.

The frequency-domain equalizer 301 estimates a channel impulse response from the time domain signal provided through the demodulating part, and converts the channel impulse response estimated thus into a frequency domain signal. The frequency-domain equalizer 301 also converts the time domain signal into a frequency domain signal. Then, the frequency-domain equalizer 301 corrects distortion of a received frequency domain signal distorted at the channel by means of parameter renewal using estimated channel impulse response of the frequency domain and the received time domain signal, and converts the frequency domain signal having the distortion therein corrected into a time domain signal, and provides to the noise removing part 302. The noise removing part 302 removes the amplified noise from the time domain signal from the frequency domain equalizer 301, and provides to the time domain equalizer 303.

In this instance, the signal equalized at the frequency domain equalizer 301 and having noise removed therefrom at the noise removing part 302 has been compensated for no signal distortion thereof caused by the fast fading.

Therefore, the time domain equalizer 303 carries out equalizing to compensate the signal having the noise removed therefrom for the signal distortion caused by the fast fading.

Then, the error providing part 304 receives the time domain signal from the time domain equalizer 303, estimates an error required for renewal of a filter coefficient of the time domain equalizer 303 from the time domain signal, and feed the error back to the time domain equalizer 303.

By renewing a coefficient of an n-tap filter of the time domain equalizer 303 by using the signal from the noise removing part 302 and the error fed back thereto, the time domain equalizer 303 compensates for a signal distortion caused by the fast fading the frequency domain equalizer 301 failed to compensate for. For an example, the time domain equalizer 303 multiplies the signal from the noise removing part 302 to the error at every filter of each tap, and renews the coefficient for each tap by adding the multiplied value of the signal and the error to a prior coefficient of each tap. The time domain equalizer 303 progresses the process of multiplying an output of each tap to the renewed coefficient for all taps at a time, adds the multiplied values of all taps, and slices the added value. The sliced value is provided to the error providing part 304.

The time domain equalizer 303 can renew coefficient faster than a field synchronization period. The time domain equalizer 303 may be of an LMS (Least Mean Square) type, RLS (Recursive Least Square) type, or ZF (Zero Forcing) type.

The error providing part 304 provides an error to be used for renewal of coefficient at the time domain equalizer 303. In the first preferred embodiment of the present invention, the error is estimated from an output of the time domain equalizer 303. There are different methods for estimating the error, and a known method may be used.

For an example, when a transmitter transmits a training sequence, the error providing part 304 takes a difference between an output of the time domain equalizer 303 and the training sequence as an error, and feeds the difference back to the time domain equalizer 303. The training sequence is a known reference signal from the transmitter so that a reception system can adjust a certain function automatically. If there is no training sequence, the error providing part 304 takes a difference between the time equalized signal and a sliced signal of the time equalized signal as the error, and feeds the error back to the time domain equalizer 303.

Thus, the channel equalizer in accordance with the first preferred embodiment of the present invention includes the frequency domain equalizer 301, the noise removing part 302, and the time domain equalizer 303 in succession, wherein the error required for renewal of the coefficient of the time domain equalizer 303 is obtained by using a signal passed through the time domain equalizer 303.

Figure 4:
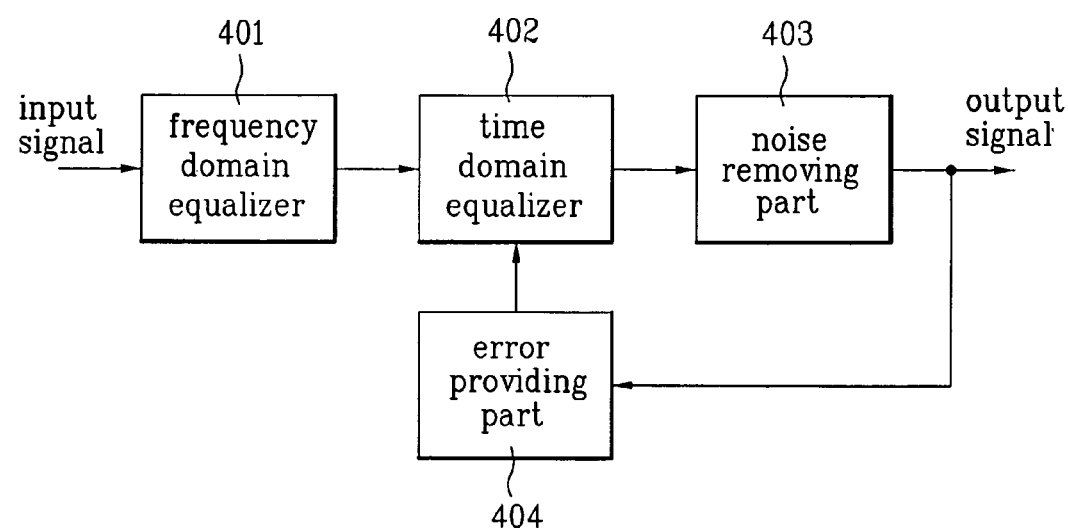
FIG. 4 illustrates a block diagram of a channel equalizer in a digital TV receiver in accordance with a second preferred embodiment of the present invention.

FIG. 4 illustrates a block diagram of a channel equalizer in a digital TV receiver in accordance with a second preferred embodiment of the present invention, wherein a time domain equalizing is carried out before noise removal from a frequency domain equalized signal.

Referring to FIG. 4, there is a frequency-domain equalizer 401 with an output terminal connected to a time domain equalizer 402, to an output terminal of which a noise removing part 402 is connected, a signal from which is provided to an error providing part 404. The operation of each of the units may or may not be identical to the units of the first embodiment, of which description will be omitted, as it does not make any difference even if the operation of the units is identical.

That is, in the second embodiment equalizer shown in FIG. 4, the time domain equalizer 402 is provided between the frequency domain equalizer 401 and the noise removing part 403, and the error providing part 404 uses the signal passed through the noise removing part 403 for calculating an error required for renewal of a coefficient of the time domain equalizer 402.

Thus, since the time domain equalizer 402 is provided before the noise removing part 403, the noise removal can be made more effectively as the fading is removed before removal of the noise. Moreover, since the error for the time domain equalizer 402 is calculated from a signal having the noise removed therefrom, a better quality error can be obtained.

Figure 5:
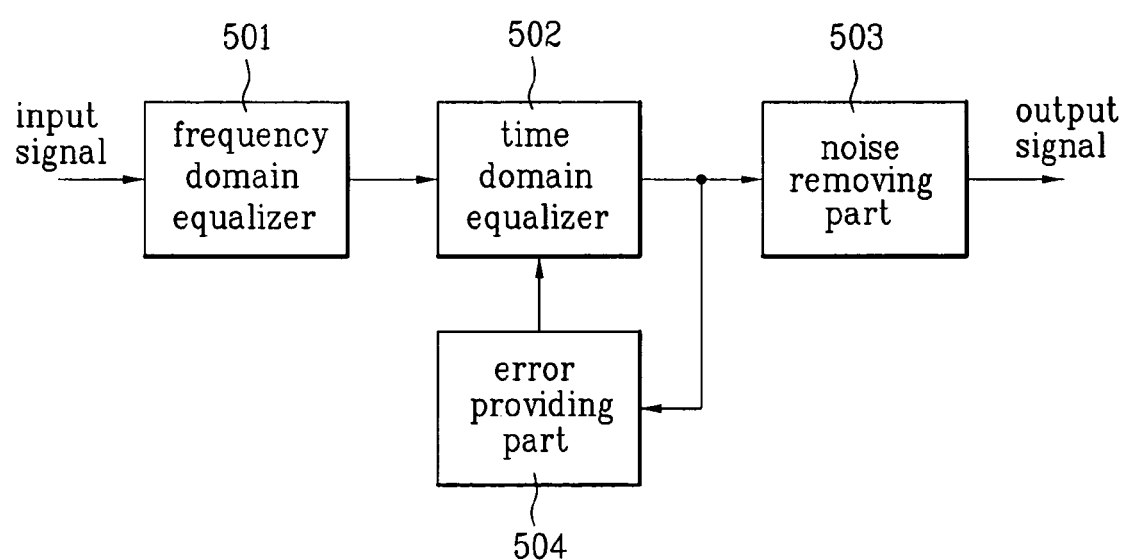
FIG. 5 illustrates a block diagram of a channel equalizer in a digital TV receiver in accordance with a third preferred embodiment of the present invention.

FIG. 5 illustrates a block diagram of a channel equalizer in a digital TV receiver in accordance with a third preferred embodiment of the present invention, wherein, different from FIG. 4, an error is obtained from a signal passed through time domain equalizing.

Referring to FIG. 5, there is a frequency domain equalizer 501 with an output terminal, a time domain equalizer 502 is connected thereto, to an output terminal of which a noise removing part 503 is connected. A system up to this is the same with FIG. 4. What is different from FIG. 4 is that a signal from the time domain equalizer 502 is provided to an error providing part 504 for detecting an error used for renewal of a coefficient of an n-tap filter. Alikely, the operation of each of the units may or may not be identical to the units of the first embodiment, of which description will be omitted, as it does not make any difference even if the operation of the units is identical.

That is, in the third embodiment equalizer shown in FIG. 5, the time domain equalizer 502 is provided between the frequency domain equalizer 501 and the noise removing part 503, and the signal passed through the time domain equalizer 502 is used for calculating an error required for renewal of a coefficient of the time domain equalizer 502.

Thus, by combining the related art channel equalizer with a time domain equalizer, the channel equalizer of the present invention solves the problem of coefficient renewal speed of the related art caused by renewal of the coefficient at every field synchronization only by using the frequency domain equalizer.

As has been described, by making time domain equalizing after frequency domain equalizing, the channel equalizer in a digital TV receiver of the present invention can improve the problem of slow coefficient renewal caused when only a frequency domain equalizer is used.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A channel equalizer in a digital TV receiver, comprising:
    a frequency domain equalizer for equalizing a received signal to remove a distorted component from the received signal;
    a noise removing part for removing noise from the equalized signal;
    a time domain equalizer for equalizing a signal from the frequency domain equalizer or the noise removing part to remove a distorted component from the signal; and
    an error providing part for estimating an error required for renewal of a coefficient at the time domain equalizer by using a signal from the time domain equalizer or the noise removing part, and feeding the error back to the time domain equalizer,
    wherein the time domain equalizer makes coefficient renewal by using one of signals from the frequency domain equalizer and the noise removing part and an error fed back from the error providing part, to compensate the signal for a signal distortion caused by fast fading.

2. The channel equalizer as claimed in claim 1, wherein the frequency domain equalizer carries out the steps of,
    converting a received time domain signal into a frequency domain signal,
    equalizing the frequency domain signal, and
    converting the equalized frequency domain signal into a time domain signal.

3. The channel equalizer as claimed in claim 1, wherein the frequency domain equalizer carries out the steps of;
    estimating a channel impulse response from a received time domain signal,
    converting the estimated channel impulse response and the time domain signal into frequency domain signals,
    making coefficient renewal by using the converted frequency domain signal to correct distortion of the frequency domain signal, and
    converting the distortion corrected frequency domain signal into a time domain signal.

4. The channel equalizer as claimed in claim 1, wherein the noise removing part is connected to one of output terminals of the frequency domain equalizer, and the time domain equalizer.

5. The channel equalizer as claimed in claim 1, wherein time domain equalizer is connected to one of outputs of the frequency domain equalizer and the noise removing part.

6. The channel equalizer as claimed in claim 1, wherein the time domain equalizer makes coefficient renewal faster than a field synchronization period.

7. The channel equalizer as claimed in claim 1, wherein the time domain equalizer is of an LMS (Least Mean Square), a RLS (Recursive Least Square), or a ZF (Zero Forcing) type.

8. A channel equalizer in a digital TV receiver, comprising:
    a frequency domain equalizer for equalizing a received signal to remove a distorted component from the received signal;
    a noise removing part connected to an output terminal of the frequency domain equalizer for removing noise from a signal equalized at the frequency domain equalizer;
    a time domain equalizer connected to an output terminal of the noise removing part for equalizing a signal from the noise removing part to remove a distorted component from the signal; and an error providing part for estimating an error required for renewal of a coefficient at the time domain equalizer by using a signal from the time domain equalizer, and feeding the error back to the time domain equalizer, wherein the time domain equalizer makes coefficient renewal by using a signal from the noise removing part and an error fed back from the error providing part, to compensate the signal for a signal distortion caused by fast fading.

9. The channel equalizer as claimed in claim 8, wherein the frequency domain equalizer carries out the steps of;

estimating a channel impulse response from a received time domain signal, converting the estimated channel impulse response and the time domain signal into frequency domain signals, making coefficient renewal by using the converted frequency domain signal to correct distortion of the frequency domain signal, and converting the distortion corrected frequency domain signal into a time domain signal.

10. The channel equalizer as claimed in claim 8, wherein the time domain equalizer makes coefficient renewal faster than a field synchronization period.

11. The channel equalizer as claimed in claim 8, wherein the time domain equalizer is of an LMS (Least Mean Square), a RLS (Recursive Least Square), or a ZF (Zero Forcing) type.

12. A channel equalizer in a digital TV receiver, comprising:

a frequency domain equalizer for equalizing a received signal to remove a distorted component from the received signal;

a time domain equalizer connected to an output terminal of the frequency domain equalizer for equalizing a signal from the frequency domain equalizer to remove a distorted component from the signal;

a noise removing part connected to an output terminal of the time domain equalizer for removing noise from a signal equalized at the time domain equalizer; and an error providing part for estimating an error required for renewal of a coefficient at the time domain equalizer by using a signal from the noise removing part, and feeding the error back to the time domain equalizer, wherein the time domain equalizer makes coefficient renewal by using a signal from the frequency domain equalizer and an error fed back from the error providing part, to compensate the signal for a signal distortion caused by fast fading.

13. The channel equalizer as claimed in claim 12, wherein the time domain equalizer makes coefficient renewal faster than a field synchronization period.

14. The channel equalizer as claimed in claim 12, wherein the time domain equalizer is of an LMS (Least Mean Square), a RLS (Recursive Least Square), or a ZF (Zero Forcing) type.

15. A channel equalizer in a digital TV receiver, comprising:

a frequency domain equalizer for equalizing a received signal to remove a distorted component from the received signal;

a time domain equalizer connected to an output terminal of the frequency domain equalizer for equalizing a signal from the frequency domain equalizer to remove a distorted component from the signal;

a noise removing part connected to an output terminal of the time domain equalizer for removing noise from a signal equalized at the time domain equalizer; and an error providing part for estimating an error required for renewal of a coefficient at the time domain equalizer by using a signal from the time domain equalizer, and feeding the error back to the time domain equalizer, wherein the time domain equalizer makes coefficient renewal by using a signal from the frequency domain equalizer and an error fed back from the error providing part, to compensate the signal for a signal distortion caused by fast fading.

16. The channel equalizer as claimed in claim 15, wherein the time domain equalizer is of an LMS (Least Mean Square), a RLS (Recursive Least Square), or a ZF (Zero Forcing) type.

* * * * *